United States Patent Office 3,795,745
Patented Mar. 5, 1974

3,795,745
PREPARATION OF WORT FOR MAKING BEER
Mortimer Wilkes Brenner, Scarsdale, N.Y., assignor to Schwarz Services International Limited, Mount Vernon, N.Y.
No Drawing. Filed Mar. 22, 1971, Ser. No. 127,037
Int. Cl. C12c 7/00
U.S. Cl. 426—29                                     15 Claims

ABSTRACT OF THE DISCLOSURE

There are disclosed processes and compositions for the making of a wort for brewing or for cereal type foodstuffs, comprising the use of a discrete proteolytic enzyme in combination with an enzymically rich unmalted cereal grain, such as barley, to release latent enzymes in the grain. In making a brewers' wort the process and composition permits the use of only 5% to 35% malt for a wort from which a satisfactory beer may be made. The use of sodium metabisulfite as an activator for the protease is also disclosed.

BACKGROUND OF THE INVENTION (a) Field of invention

The present invention relates to the production of a raw material for use in the manufacture of non-distilled alcoholic beverages. More particularly, it relates to the production of a wort, to the concentration of such a wort into a syrup or a dry powder, and to manufacture of non-distilled alcoholic beverages such as beer, porter, stout, ale, and lager and cereal type foodstuffs such as baby foods.

(b) Description of the prior art

The production of such beverages normally involves, as is well known, the initial formation of a sugary nitrogenous wort in a mashing process followed by a fermentation process in which fermentable sugars such as maltose present in the wort are converted into alcohol and carbon dioxide. In the brewing of beer, the wort is commonly produced by mashing a slurry of barley malt and adjuncts such as prepared cereals, raw cereal grains such as corn and rice, or some other carbohydrate source. Unmodified starch-bearing materials such as raw corn grits, should be precooked in a separate cooker before being added to the main mash. This is generally done by mixing them with water and a small quantity of finely ground malt, or an α-amylase enzyme and then boiling the mixture. The malt or amylase enzyme liquefies the starch-bearing material, thereby facilitating the subsequent conversion of starch to sugar during the mashing operation. A brewers' wort is a complex material containing not only fermentable sugars but also amino acids, vitamins, mineral salts, melanoidins and other nutritional and flavor factors.

It is well recognized that malt, by virtue of enzymes present therein, plays an important role in the obtention of a brewers' wort with characteristic properties. The most important enzymes present in the malt are: α-amylase which liquefies and/or hydrolyses any starch-bearing material contained in the mash bill producing mainly sugars and dextrins; α-amylase which saccharifies the dextrins of the liquefied starch to simple, fermentable sugars, chief among which is maltose; proteolytic enzymes, a series of enzymes which break down highi molecular weight proteins to form lower peptides and considerable amounts of amino acids. These decomposition products of proteins not only provide nutrients for subsequent yeast growth during fermentation, but largely determine the character of the beer, and markedly influence its flavor as well as the foam and haze stability.

This reliance upon malted cereals, typically malted barley, which is a feature of present practice, is attended by several significant disadvantages. In the preparation of the malt, the grain of barley, or, less commonly, of wheat or other cereals, is first soaked or steeped in water, allowed to germinate or grow, dried, then separated from the accompanying rootlets, and finally crushed. Since the normal time of soaking in water, or steeping, is from ½ to 2 days, the time for germination or growth is 2 to 6 days, and the time for drying or kilning is approximately 1 to 2 days, it will be seen that the overall process of malting may require anywhere between 4 and 10 days. This is the time considered necessary to adequately develop the protein bodies, decomposition products, flavor and color factors that are characteristic of malt utilized in the subsequent mashing process. Consequently, it will be appreciated that a considerable amount of equipment, building space and supply of utilities is required for the proper conduct of this process and it demands careful supervision through the various stages by skilled technical personnel. Furthermore, it is generally recognized that it is preferable not to use malt directly as it is taken from the kiln, because of the inequalities in the moisture content of the dried grain and, it is recommended that malt may be stored for 2 to 3 weeks before use. All this means that malt is a relatively expensive material which, over the years, is becoming progressively more costly. Moreover, malt is susceptible to bacterial contamination during the manufacture thereof and, if this occurs, it tends to impart an undesirable dark color and an abnormal taste to the wort.

For some time now, the brewing art has recognized the foregoing disadvantages of malt, and proposals have been made to lessen the importance of malt in the manufacture of a brewers' wort by the use of discrete commercial enzyme preparations.

One approach to the replacement of malt in the manufacture of a brewers' wort is taught in U.S. Pat. No. 3,353,960 issued to Bavisotto in 1967. This describes a process using conventional brewing materials, i.e. malt and the usual malt or amylase liquefied cereal adjuncts, wherein the malt to adjunct ratio may be reduced from the conventional ratio of 65:35 to approximately 50:50 or even as low as 40:60. In other words, the Bavisotto process is concerned with a reduction of 15 to 25 parts (by weight) in the malt content of an otherwise conventional mash bill and there is no teaching therein of the use of raw enzymically rich cereal grains such as barley. Bavisotto further discloses that all of the enzymatic activity needed to compensate for the reduction in malt content is obtained from α-amylase enzymes and proteolytic enzymes present in the malt (he does not disclose the use of any raw cereal grain which itself contains any significant enzyme activity) supplemented by the addition of a proteolytic enzyme such as papain, ficin, bromelain, pancreatin, or a fungal or bacterial protease.

Bavisotto also discloses that it is preferred to add an α-amylase enzyme such as a bacterial α-amylase as the malt:adjunct ratio drops to 45:55 and down to the lower limit of malt content which he teaches, namely 40 parts malt to 60 parts liquefied cereal adjunct (40:60). In the Bavisotto process, the proteolytic enzyme and (when the malt content falls below 45 parts by weight) α-amylase enzyme, are added to a malt mash at a temperature up to 70° C., the enzyme-containing mash held at such a temperature for 10 to 90 minutes and, thereafter, the liquefied cereal grain adjunct is added.

A more radical approach to the replacement of malt involves the use of unmalted, i.e. raw, enzymically rich cereal grains, typically barley, in the mash bill and discrete enzyme preparations. This approach has attracted much interest of recent years and it has been the subject of numerous publications. For instance, in U.S. Pat. No. 3,081,172, issued to Dennis and Quittenton in 1963, a brewers' wort is described which is obtained from a mash of raw cereal grains, for example, barley, treated with a commercially available mixture of α-amylase and proteolytic enzymes, in partial or complete replacement of the malt. The mash is held at temperatures at which the added enzymes firstly degrade the protein and then convert the liquefied starch to sugar.

In 1967, Macey and coworkers published (EBC Proc. 11th Cong. 1967 p. 263) a report on experiments in which a brewers' wort was derived from 100% ground raw barley treated with a commercial enzyme preparation containing predominantly α-amylase activity but with some proteolytic activity.

In Canadian Pat. No. 803,488 issued in 1969 a process is described in which a brewers' wort is prepared from a ground starch-containing material such as barley which is first made into a mash with water, acidified to pH 2.0 to 3.5 and then treated sequentially, at appropriate temperatures, with an α-amylase and a proteolytic enzyme.

More recently, Wieg et al. have described (Process Biochemistry, 1969 4(5),33) a process for making a brewers' wort wherein a mash bill containing 75 to 85% by weight raw cereal grains, typically a mixture of barley and corn (e.g., 55% by weight barley and 20% by weight corn), and 15 to 25% by weight malt is treated with a proprietary commercial enzyme system containing α-amylase and proteolytic enzymes and probably other enzyme systems such as β-glucanase and glucoamylase.

A recent review of the state of the art pertaining to the replacement of some or all of the malt by unmalted cereal grains such as barley and discrete commercial enzyme preparations has been published by Sorenson (Process Biochemistry, April 1970, p. 60). In this review, Sorenson, among other things, teaches that the replacement of malt with raw barley requires the addition of proteolytic, α-amylase, and β-glucanase enzymes and, in some cases, saccharifying enzymes like glucoamylase or fungal β-amylase. This is consonant with the various proposals summarized in the foregoing prior art wherein, a common theme is the need to use at least an α-amylase and a proteolytic enzyme in the mashing process in order to obtain adequate conversion and saccharification and, overall, an acceptable wort. Sorenson further alludes to the lautering and filtration difficulties experienced when mashing with large quantities, say 30 to 50% by weight, of raw barley; such difficulties are considered to be attributable to the presence of water-soluble "gummy" materials (β-glucans) which impart a higher viscosity to the wort. He indicates that these can be overcome by the addition to the mash of a β-glucanase-containing enzyme preparation. Sorenson also reiterates the view of contemporary practice, as indicated by the foregoing and other related publications, that it will not be realistic to aim at total replacement of malt in the mash bill but rather to conserve, 20 to 25% by weight.

Whilst there has been continuing interest in this approach over the last ten or so years, the replacement of a substantial amount of malt with raw, enzymically rich cereal grains like barley has not yet attained any significan degree of commercial acceptance, especially in countries, such as the U.S.A. and Canada, with a relatively sophisticated brewing industry. Though the reasons for this are doubtless many and various an important factor militating against a brewer adopting this approach has been the high cost of the complex enzyme preparations, which desirably are of standardized activities. This has meant that the cost savings to the brewer are not so significant as might have been anticipated. For instance, an enzyme preparation commercially available at the present time for use with raw cereal grains like barley in a brewing process, which contains α-amylase and proteolytic enzymes and, most probably, other enzymes such as a β-glucanase and glucoamylase costs around 18 to 22 dollars a kilo. The recommended usage level is 0.075 to 0.10% by weight based on the total weight of raw cereal grains in the brewers' mash bill. It can be calculated that for a North American brewer who uses a typical mash bill comprising 20 parts by weight malt, 40 parts by weight barley and 40 parts by weight corn (as compared, say, to a conventional 65:35 malt:adjunct mash bill) the approximate average cost saving would usually be of the order of 5%. This is not enough incentive to encourage most brewers to adopt the radical departure from well-tried, time-honored, and proven practice that inheres with the replacement of a significant amount of the malt in the mash bill with unmalted, raw cereal grains. Another problem with the complex enzyme preparations hitherto regarded as essential in the successful replacement of malt with unmalted cereal grains is that arising from enzyme compatibility. Enzymes are proteins and as such can be degraded or inactivated by other enzymes. Since commercially available proteolytic and amylase enzymes involve different systems derived from different sources, compatibility is largely unknown and erratic so that it is difficult to provide a preparation of standardized activity. Consequently, it is difficult to set up a routine, standardized brewing schedule to obtain consistent and reproducible results in the wort, and thus to obtain a beer of desirable flavor, body, stability, chemical composition, color, etc., and to be able to adjust different process parameters to take account of other variable factors. A further problem associated with the use of the enzyme preparations presently available is that the desired degree of saccharification needed to provide an acceptable content of fermentable sugars in the wort usually requires the inclusion of a glucoamylase or like enzyme (cf. Wieg et al., p. 36). Such enzymes often adversely affect the flavor and foam stability of the resulting beer.

BRIEF STATEMENT OF INVENTION

It has been found that, contrary to the teaching in the prior art pertaining to the reduction of the malt content in a brewer's mash bill using raw cereal grains and complex enzyme preparations, a discrete proteolytic enzyme alone gives a satisfactory brewers' wort of comparable quality and with similar nitrogen and carbohydrate profiles to worts produced using preparations containing both α-amylase and proteolytic enzymes or even more complex enzyme preparations. Quite unexpectedly, no marked lautering or filtration problems were encountered even when operating, as is preferred, with high levels of raw cereal grains such as barley. The worts so-obtained when fermented gave beers of acceptable and desirable taste, body, stability, chemical composition, color, etc.

The salient feature of this process resides in the fact that it permits the brewer to reduce the malt content in the mash bill to between about 35 parts down to about 5 parts by converting raw barley or other enzymically rich cereal grains (which are usually carried through a melting process) into soluble, hydrolyzed carbohydrate and hydrolyzed protein-containing materials, such as are required in the preparation of a brewers' wort, through the use of a discrete proteolytic enzyme alone. This proteolytic enzyme liberates the bound and latent enzyme systems naturally present in the unmalted grain and permits the raw grain to be used in conventional brewing procedures and techniques without having to carry it through the costly and lengthy malting process.

The economic advantages of being able to use a single discrete enzyme instead of a complex enzyme preparation as taught in the prior art will be obvious. The use of this invention thus far in commercial breweries indicates an approximate cost saving to the brewer of at least 10% per barrel of beer which is an improvement of 100% or more compared to the enzyme preparations hitherto available for this purpose.

Accordingly, the present invention in one of its aspects provides a process for producing a brewers' wort from a mash bill comprising enzymically rich raw cereal grains such, for example, as barley and between about 5 and about 35 parts by weight, based on the total weight of the mash bill, malt which comprises commingling an aqueous slurry of at least about 20 parts by weight of the ground, enzymically rich raw cereal grains with a discrete proteolytic enzyme, preferably in an amount of at least 10 Azocoll units per gm. of cereal grain and, optionally, some or all of the malt, then, with the pH of the slurry at between about 5.0 and about 6.5 holding said slurry at a temperature of between about 40° and about 60° C. for from about 10 to 480 minutes whereby the proteolytic enzyme acts upon the ground cereal grain to liberate bound $\beta$-amylase and other enzymes present therein, thereafter, introducing any remaining malt, or all of the malt if it has not previously been introduced, raising the combined mass to a temperature of up to about 75° C., maintaining the temperature in this range for a predetermined period of time so that the desired amount of fermentable sugar is produced and, finally, separating the wort so obtained from the residual solid material (spent grains). Preferably, the proteolytic enzyme is used in an amount of 30 to 300 Azocoll units, with 40 to 160 Azocoll units constituting a highly preferred range. Preferably, the slurry is held at 40° to 60° C. for between about 40 and about 240 minutes.

A further advantageous feature of the process of this invention is that it is possible to produce satisfactory worts and good quality beer from mash bills comprising as much as 40 parts by weight or more, of a starchy, low-enzymic adjunct such as corn. In such a process as provided by this invention up to 40 parts by weight, preferably between 25 and 40 parts by weight, based on the total weight of the mash bill of a starchy, low-enzymic cereal adjunct is incorporated with the main mast at, or toward, the end of the first heating stage. Conveniently, this adjunct is incorporated in the form of a liquified mass of starch-bearing grains such, for example, as corn grits, corn meal, rice, sorghum and the like. Alternatively, it may take the form of prepared, i.e. gelatinized, starch-bearing grains such, for example, as corn flakes, or wheat flour which does not require pre-gelatinization.

The term "discrete proteolytic enzyme" as used herein connotes an enzyme which has been extracted and purified commercially and which manifests predominantly proteolytic activity, though trace amounts of other enzyme activities may also be present.

The determination of protease activity to which reference is made in this specification involves the following specific biochemical assay.

Reagents (a) Azocoll-cysteine mixture from Schwarz Services International Limited, Mount Vernon, N.Y.
(b) 1.0 molar acetic acid.
(c) Concentrated citrate buffer. Prepare by dissolving 70 gm. of citric acid (reagent grade) in about 720 ml. of 1.0 normal sodium hydroxide. Adjust to pH 5.0 with additional sodium hydroxide as needed, then dilute to 1 liter with freshly boiled and cooled distilled water.
(d) Dilute citrate buffer. Dilute 10 ml. concentrated citrate buffer to 100 ml. with boiled distilled water when ready to use.
(e) All water used for solutions should be free of copper and other metals. Water for preparation of enzyme solutions should also be deaerated.

Apparatus (a) 25 ml. Erlenmeyer flasks.
(b) 35 mm. short stem funnels.
(c) Whatman filter paper, No. 1 (7 cm.).
(d) Pipettes.
(e) Interval timer.
(f) 500 ml. volumetric flasks.
(g) Coleman Jr. Spectrophotometer—Model A with 25 mm. diameter x 105 mm. cuvettes or equal.
(h) 100 ml. volumetric flasks.
(i) Dubnoff metabolic shaking incubator.

Procedure

1. The concentration of the enzymes used for testing should give results in an optical density range of between 0.100 and 0.300 at 525 mmu. for a 25 mm. tubular cell, after substracting the blank. This optical density range is used in order to avoid unfavorable ratio of test to blank and to avoid exhaustion of substrate. For commercial enzymes, the test solution may be prepared by dissolving, for first trials, about 100 mg. of the material in 500 ml. of water at 20° to 25° C. Various aliquots, not exceeding 1.0 ml., may then be used for the test, for example, 0.10, 0.25, 0.50 and 1.0 ml. If the color falls outside the preferred range for all aliquots, repeat after adjusting sample size.
2. Add 1 scoop of Improved Azocoll-cysteine mixture and 4 ml. of dilute citrate buffer to 25 ml. Erlenmeyer flask.
3. Stopper flasks and swirl to mix. Attemperate each flask in a Dubnoff metabolic shaking incubator at 40° C.±0.4° C. and 84 r.p.m. for 10 to 15 minutes before the enzyme is added. The enzyme test solution itself is not attemperated prior to use.
4. Pipette 1.0 ml. of enzyme test solution (or 1.0 ml. total volume of enzyme test solution and distilled water, to reach standard test volume) to each flask; and allow the reaction to proceed for one-half hour at 40° C. and 84 r.p.m.
5. After the one-half hour digestion period is completed, add 10 ml. of 1.0 M acetic acid to stop the enzyme reaction.
6. Filter the mixture through Whatman No. 1 filter paper. The absorbance of the solution is read at 525 mmu. against the blank.
7. Prepare blanks by adding 10 ml. of 1.0 M acetic acid to the buffered Azocoll before the enzyme is added. Incubate and filter blanks exactly as samples.
8. For greater accuracy, samples should be tested in triplicate and results averaged.
9. Calculate "Azocoll Activity" as below.

Azocoll Activity:

$$\text{Units per mg.} = \frac{\text{Optical density} \times 100}{\text{(Enzyme used, mg.)}}$$

The following is an example of such a calculation.

Enzyme test solution=125 mg./500 ml.
Volume test solution used=0.5 ml.
Optical density=0.200

Azocoll procedure for determination of proteolytic activity

Calculation:

$$\text{Azocoll Activity} = \frac{0.200 \times 100}{\frac{125 \text{ mg.}}{500 \text{ ml.}} \times 0.5 \text{ ml.}}$$

$$= \frac{20}{\frac{62.5}{500}} = \frac{20}{.125}$$

$$= 160 \text{ units/milligram}$$

DETAILED DESCRIPTION OF THE INVENTION

Materials

Raw, i.e., unmalted, cereal grains.—Barley is the preferred enzymically rich cereal grain substrate as the wort obtained from the enzymatic treatment thereof has carbohydrate and nitrogen spectra that correspond most closely to that of a conventional brewers' wort derived from malted barely. Further, barely contains a high content of bound or latent β-amylase and other enzyme systems which are liberated by the protease treatment and are therefore available, among other things, for converting the starch to fermentable sugars. This barley does not have to be selected for its germinating capacity, as in prior malting processes, so a cheaper quality will suffice. Other cereal grains may, however, be used including, for example, wheat, rye, sorghum or mixtures of these and other grains which are capable of being malted to modify their properties and make them more useful for the preparation of modified and hydrolyzed starch products. The grain size markedly influences the enzymatic conversion process. Preferably, the barley or like cereal grain should be ground to a particle size such that the bulk of the endosperm material has an average particle size of less than about 2 mm. without producing significant quantities of fine particles that would pass through a 60 mesh sieve. If desired, the cereal grains, such as barley, may be heated, for instance, to between 120 and 170° C., or treated with suitable chemicals before slurrying.

Cereal adjunct.—As discussed previously, an advantageous process according to this invention involves the use of a starchy, low-enzymic cereal adjunct. The use of a cereal adjunct in the mash bill may permit substantial cost savings and, at the same time, is considered to give a paler colored beer with a better shelf life.

The cereal adjunct may be derived from raw or unprepared starchy, low-enzymic cereal grains such, for example, as corn grits, corn meal, wheat flour, sorghum, rice and the like. Preferably, the cereal adjunct is used in liquefied form. The liquefaction may be accomplished by precooking the cereals in the usual cereal cooker along with a liquefying enzyme derived from a suitable source, such, for example, as a small quantity of malt or a modest quantity of a bacterial α-amylase. Alternatively, the cereal adjunct may be used directly, i.e. without prior liquefaction, in which event all of the enzymatic activity for liquefying the starch adjunct and subsequently converting it by saccharification is provided by the proteolytic release of the inherent or latent enzymes of the barley or other enzymically rich cereal grain.

Malt.—The use of a small amount of malt (between about 5 and about 35 parts by weight), preferably malted barley, in the mash bill is essential in ensuring an adequate total yield of extract and generally from the standpoints of flavor and color in the finished beer. Additionally, the use of malt satisfies traditional concepts that beer should be brewed from malt which may be reassuring to a brewer contemplating the adoption of this innovation. Ordinary brewers' malt, say of around 110° to 140° Lintner, is perfectly satisfactory, but, if desired, a high diastatic malt such as a distiller's malt, say, of around 180° to 250° Lintner, may be used.

Proteolytic enzyme.—Proteolytic enzymes which have been found to be satisfactory for use in the process of this invention include plant proteases, such as papain, ficin, bromelain, and pinguinain, as well as proteases of fungal origin such as the protease sold as Rhozyme A-4 (Rhom and Haas) or the bacterial protease from known mutants of the species Bacillus subtilis. A particularly preferred protease is papain, which is the proteolytic enzyme system derived from the Carica papaya plant. This is readily available commercially in a specially purified and standardized form and the brewer is accustomed to handling and working with this enzyme since it is widely used worldwide for chill-proofing beer. Advantageously, the proteolytic enzyme such as papain is used in combination with a catalytic amount of an activator therefor. Suitable activators include gutathione, cysteine, sodium thiosulfate, sodium metabisulfite and like reducing agents. The preferred activating agent is sodium metabisulfite. Typically, the activator, when used, is present in an amount of between 0.001 and 0.1% by weight, based on the weight of the unmalted grain in the mash bill. If desired, the proteolytic enzyme and the activator may be used in the process in the form of a prepared composition containing said enzyme and activator in appropriate, defined amounts. Accordingly, therefore, this invention in its composition of matter aspect provides a composition for use in preparing a brewers' wort from a mash bill which includes an enzymically rich cereal grain such, for example, as barely and between about 5 and about 35 parts by weight malt, said composition comprising an intimate admixture of between about 20 parts and about 90 parts by weight of a proteolytic enzyme with a standardized activity of between about 150 and about 250 Azocoll units per mg. and between about 10 parts and about 80 parts by weight of an activator therefor. Such a composition may be used directly in the process or, alternatively, it may be diluted to provide a desired level of protease activity.

Mash bill.—Advantageously, the mash bill utilized in the process of this invention includes three components: a raw, enzymically rich cereal grain, typically barley, malt, typically, malted barley and a starchy, low-enzymic cereal adjunct, typically corn grits. Usually the three components are present in the mash bill in amounts of 20 to 55 parts by weight, malted barley and 20 to 40 parts by weight, corn adjunct. Many successful experiments have been performed using a mash bill comprising 35 parts by weight ground barley, 25 parts by weight malted barley and 40 parts by weight corn. It will be seen that this sum of 60 parts of barley and malt in relation to 40 parts of corn closely approaches the conventional ratio for the production of beers in which malt and adjuncts are used. It will further be seen that this ratio indicates that the larger part of the total quantity of unmalted barley, and malt is the unmalted barley, and that the sum of the two ingredients combined performs the normal function of malted barley. While such three component mash bills are often advantageous, the process of this invention has been conducted successfully with two component mash bills comprising (1) raw, enzymically rich cereal grain, typically barley, and (2) malt, typically malted barley. Usually the two components are present in the mash bill in amounts of 70 to 90 parts by weight barley and 10 to 30 parts by weight malt.

Process.—The barley used in the mash bill is crushed, ground or rolled to the desired size, in the customary manner; for example, the grains may be reduced so that at least 40 percent passes through a No. 10 sieve and less than 5 percent passes through a No. 60 sieve. In this condition each resulting granule will expose a considerable portion of the interior of the original grain substance and the ratio of surface area to granule mass or volume is relatively high. Prior or subsequently to the barley grains being ground, granulated or comminuted they may be steeped or soaked in water, say, in the ratio of 1:1, at a temperature of from about 20° to about 60° C. for a period of from about 20 minutes to about 2 hours. Such a pretreatment conditions the barley grains and permits more rapid penetration of the proteolytic enzyme into the interior of the grain during the mashing process. Alternatively, the barley grains may be exposed to an atmosphere of water vapor or steam to increase the moisture content of the hull without wetting the endosperm. The ground barley, pretreated or not as the case may be, is commingled with water to form an aqueous slurry in which the barley usually is present in an amount of between about 20 and about 40 gms. per 100 cc. water (ratio 1:5 to 1:2.5). Typically, the slurry water has a calcium hardness equivalent to not less than about 100 parts per million by weight of $CaCl_2$. In cases where the calcium level or the water supply is below the desired level, adjustment, for instance, by addition of calcium chloride, may be made. The discrete proteolytic enzyme, say, papain is added to this aqueous slurry desirably in combination with an activator such as sodium metabisulfite or like reducing agents. For convenience, a prepared composition containing suitable amounts of the enzyme and activator may be used. The quantity of enzyme required is relatively small, but the actual amount depends upon the activity level of the particular proteolytic enzyme used. Conveniently, enzyme of standardized, reproducible activity is employed. Desirably, the proteolytic enzyme should be used in an amount of at between about 10 and about 500, preferably 30 and 300, more preferably 40 to 160 Azocoll units per gm. of cereal grain substrate. For instance, a commercially available papain enzyme has an activity level of between about 30 and about 300 Azocoll units per mg. and this particular enzyme is used in an amount of between about 50 parts and about 150 parts to 100,000 parts unmalted cereal grains by weight. With other proteolytic enzymes as little as 10 parts of the discrete enzyme to 100,000 parts unmalted cereal grains may be used. This aqueous slurry is advantageously held at a temperature of between 35° and 60° C., preferably around 40° C., for between 10 and 60 minutes.

When the cereal adjunct is to be employed, this is mashed separately in a cooker in a conventional manner, preferably employing a small amount of bacterial α-amylase to help keep the viscosity of the boiled adjunct-water mixture sufficiently low so that it may be pumped or handled through the usual pumps, pipelines, and other brewhouse equipment.

The prepared adjunct mash, if adjunct is used, is transferred from the cooker to the main barley mash and the combined mash thoroughly stirred. It is preferable that the temperature of the combined mash during this mashing in should not exceed 70° C., so as to conserve enzymic activity. The small amount of malt, say 10 to 30 parts by weight, is usually also incorporated in the mash at this stage.

After the mixture of the liquified non-barley adjunct with the main mash, the latter also containing the major portion, or all of the malt used in the particular mash bill, the combined mash is allowed to rest at temperatures between about 60° C. and about 75° C., a predetermined period of time whereupon the enzymes, principally β-amylase, liberated from the barley by the action of the proteolytic enzyme thereon act autolytically and upon the starch of the substantially nonenzymic cereal adjunct, when employed, to produce, along with the saccharifying enzymes present in the malt, the desired content of fermentable sugars, without the need to add glucoamylase or similar enzymes to achieve normal saccharification or fermentability. This saccharification may take anywhere from between 1 and 8 hours, usually 1½ to 6 hours. If saccharification is permitted to continue for too long, the physico-chemical and organoleptic properties of the beer manufactured from the wort may be detrimentally affected.

At the conclusion of the saccharification step, the mash may be briefly heated at a higher temperature, say, 72° to 78° C. This heating tends to destroy the enzyme systems and therefore to stabilize the composition of the wort. After the heating, the mash is transferred into, for example, a conventional brewery lauter tun, mash filter or a centrifuge wherein the wort is separated from the spent grains.

When barley is used as the cereal substrate in the foregoing procedures, a properly balanced, light-colored wort with satisfactory starch and protein breakdown may be obtained using simply a discrete proteolytic enzyme. Moreover, such a wort normally has comparable fermentable sugar and nitrogen contents, as indicated by apparent attentuations of around 75% or more, total nitrogen levels of over 900 p.p.m. or more and formol nitrogen levels of around 250 to 350 mg./litre, to the worts derived from more complex enzyme preparations such as mixtures of a proteolytic and an α-amylase enzyme using the same mash bills or the worts derived from a conventional 65:35 malt:adjunct mash bill.

The wort so-obtained may be used directly in making beer by the standard process steps, so serving as a full replacement for a conventionally produced wort which simplifies the plant required and results in other economies. Alternatively, the wort may be evaporated to a syrup using, for example, a vacuum evaporator. This syrup may then be stored until required, say, to increase the throughput of a conventional process at peak times. In this event, the syrup, before use, is diluted with water. Advantageously, the syrup contains between about 70 and about 85 percent by weight total solids, preferably about 75 to 80 percent. Alternatively, the wort may be dried into a powder, using for example a spray drier, which is then dissolved in water to give a wort as and when required. When concentrating or drying, careful temperature control is advisable to avoid discoloring or otherwise damaging the wort properties. If desired, bittering substances like hops may be added before concentrating or drying the wort.

In converting the wort into beer, the conventional procedures are employed. For instance, the wort is admixed with bittering adjuncts like hops or hop extracts and boiled. The heat completely inactivates the enzymes and sterilizes the wort, and forms typical, normal flavor and color substances such as melanoidins while the extraction of the hops provides flavor and preservative constituents. The wort is thereafter cooled and fermented by the addition of an appropriate brewers' yeast, such as a "bottom yeast" commonly employed in the manufacture of the type of alcoholic beverage generally known as lager, or a "top yeast" commonly employed in the manufacture of the type of alcoholic beverage generally known as ale. The yeast utilizes the normally fermentable sugars which are present in the wort. Thereafter, the beer is clarified or filtered, carbonated if desired and packaged.

EXAMPLE ILLUSTRATING PREFERRED EMBODIMENTS

The following examples, some of which are comparative in nature, are provided to facilitate a more comprehensive understanding of the present invention. It will be understood that the examples are given by way of illustration only and should not be construed as limiting the scope of the inevntion.

Example 1

This example illustrates the manufacture of a brewers' wort and beer according to this invention on a commercial scale in a brewery.

Part A—Brewers' wort

Raw materials (i) Barley.—Conquest barley was used. This barley was cleaned and then ground using a Seck-L.D. grinder. Sieve analysis of the mixture was as follows: (U.S. Standard Sieve sizes used throughout).

| Sieve No.: | Percent w./w. retained on |
|---|---|
| 10 | 80.26 |
| 14 | 12.90 |
| 18 | 3.12 |
| 30 | 1.85 |
| 60 | 1.18 |
| 100 | 0.29 |
| 100+ | 0.34 |
|  | 99.94 |

(ii) Corn.—Raw corn grits with the following analysis were used as the cereal adjunct.

| Moisture | Percent | 11.3 |
|---|---|---|
| Oil | do | 0.78 |
| Extract content | d.b. | 91.8 |

Sieve analysis
| sieve No.: | Perecnt w./w. retained on |
|---|---|
| 10 | 0 |
| 14 | 2.1 |
| 18 | 13.7 |
| 30 | 40.6 |
| 60 | 38.5 |
| 100 | 3.3 |
| 100+ | 1.8 |
| | 100.0 |

(iii) Malt.—Ground barley malt was used with a diastatic activity of 130° Lintner and a moisture content of 4.0%. The grist spectrum as determined by screen analysis was as follows:

| Sieve No.: | Percent w./w. retained on |
|---|---|
| 10 | 59.5 |
| 14 | 14.9 |
| 18 | 10.5 |
| 30 | 6.9 |
| 60 | 3.2 |
| 100 | 1.6 |
| 100+ | 3.1 |
| | 99.7 |

(iv) Water.—Ordinary brewery water was used with a total hardness of around 35 p.p.m. (Calcium≡30 p.p.m.; sulfates≡5 p.p.m.)

(v) Salt addition.—Dilute sulfuric acid and calcium chloride, in the amounts indicated, were added to the main mash and the cooker mash to bring the hardness up to the desired levels.

(vi) Proteolytic enzyme.—The proteolytic enzyme used was the vegetable protease, papain, in combination with sodium metabisulfite as the activator. The combination was used in the form of a prepared composition comprising an intimate mixture of 46 parts by weight powdered papain and 54 parts by weight powdered sodium metabisulfite. The composition had a protease activity of 90 Azocoll units per milligram. This prepared composition was used in the mashing process at a level of 1.36 kgs. to provide about 96.5 Azocoll units of protease activity for each gm. of unmalted cereal used in the mash bill.

MASH BILL

| Constituent | Weight (kg.) | Parts by weight of total mash bill |
|---|---|---|
| Ground barley | 907 | 57 |
| Raw corn grits | 363 | 23 |
| Malt | 317 | 20 |

Part B—Mashing process

Step 1.—25 brewers' barrels (bbl.) of brewery water were added to the mash tun and 1.6 kg. calcium chloride and 355 mls. dilute sulfuric acid were added thereto to impart the desired degree of hardness and pH (5.5).

| | P.p.m. |
|---|---|
| Calcium | 100 |
| Sulfate | 135 |
| Chloride | 145 |

The water was brought to a temperature of 54° C. and the 907 kg. ground barley added thereto. The slurry so obtained was vigorously stirred and, when the temperature had fallen to 50° C., 1.36 kg. of the prepared composition described above, slurried in about a gallon of water, was added thereto. The slurry was held at 50° C. for forty minutes and, at five minute intervals, was vigorously agitated. At the end of this period, the 317 kg. of dry ground malt were added, and thoroughly mixed in by stirring over a 10 minute period.

Step (ii).—Simultaneously, the raw corn grits were liquefied. 363 kg. corn grits were added to 6 bbl. water treated with 453 gms. calcium chloride in a corn cooker, and the cooker mash brought to 50° C. 680 gms. of Brewhouse Convertase (a bacterial amylase preparation commercially available from Schwarz Services International) slurried in water were added to the cooker mash. The mash was then brought up to 70° C. over 20 minutes, and held at this temperature for 15 minutes. It was then brought up to the boil over 35 minutes, and boiled for 5 minutes. The corn grits were liquefied by this treatment.

Step (iii).—The liquefied corn mash was then pumped over to, and dropped into, the mash tun. The combined mash was vigorously stirred and the temperature raised to 66° C. by direct steam injection. It was held at this temperature for 40 minutes and, at intermittent intervals during this period, was vigorously agitated. During this period latent enzymes, principally β-amylase, in the bound barley were liberated by the action of the proteolytic enzyme and such liberated enzymes acted, along with the malt, to convert the liquefied starch into fermentable sugars. The temperature of the mash was then raised to 73° C. over 5 minutes and held at this temperature, with constant mixing, for 15 minutes. The mash was then raised to from 75° to 76° C. over 5 minutes to inactivate the amylase enzymes.

Step (iv).—The mash at 75° C. was dropped directly into the lauter tun and sparged with brewing water at 74° C. 72 bbls. of wort of excellent clarity were obtained. The run-off time was 155 minutes which compared very favorably with the usual run-off time of 150 minutes in this brewery when processing a conventional mash bill (60:40 malt:adjunct). The overall time for each part of the brewing cycle was comfortably below 180 minutes which permitted 8 brews a day to be run.

The wort so obtained was light-colored and had properly balanced amino acid and carbohydrate spectra. An analysis summarizing characteristic wort properties is given in Part A of Table I hereunder, which also includes, for comparative purposes, the analyses of a typical conventional malt wort (60:40 malt:adjunct ratio) used by this particular brewery for the manufacture of its standard ale (Part B) and a wort derived from the treatment of a similar mash bill to that used in this example with a complex enzyme preparation commercially available at the present time for use in the partial replacement of malt in brewing processes (Part C). Analysis of this enzyme preparation, which was in liquid form, showed that it contained 75 α-amylase units per ml. and about 140 Azocoll units per ml. (by conversion) together with other unidentified enzymes.

α-Amylase activity in this and other examples was determined by a procedure basically similar to that described by Stein and Fischer, Journal of Biological Chemistry, 232, 869 (1958).

TABLE I

| Property | Part A | Part B | Part C |
|---|---|---|---|
| Extract (° P.) | 11.8 | 11.8 | 11.6 |
| Total nitrogen (p.p.m.) | 974 | 956 | 868 |
| Formol nitrogen (p.p.m.) | 256 | 315 | 209 |
| pH | 5.05 | 5.05 | 4.3 |
| Apparent attenuation (percent) | 77.5 | 79.6 | 75.5 |

Part B—Beer

The wort was converted directly into beer by the following procedure, which was identical to that normally employed in that brewery for the manufacture of its ale. Before the boil was started 200 gms. dilute sulfuric acid were added to the wort. The wort was boiled for 90 minutes. 45 minutes before the end of the boil 4.5 kg. of hops were added followed, 15 minutes before the end of the boil, with 700 gms. Irish moss and, finally, 10 minutes before the end of the boil a further 6.3 kg. of hope were added. During the open boil the volume fell by evaporation from 72 bbls. to about 69 bbls. At the conclusion of the boil, the wort was passed through a hop jack, from which it was slowly run into a hot wort tank, and immediately transferred to a plate cooler in which it was cooled, over 50 minutes, to 12° C. The cooled worts were then aerated to give a dissolved oxygen content of 12 to 15 p.p.m., transferred to the fermenters and "pitched" at 12° C. with a lager yeast *Saccharomyces carlsbergensis* at the rate of 175 gms. pressed yeast per barrel. The fermented young beer, after 7 days of fermentation with an apparent extract of 2.1° P. was decanted from the yeast, and passed to the primary aging tank wherein this beer was blended with the same amount of beer from the second brew made under identical conditions (the wort had essentially the same properties). The combined batch was maintained at −1° C. for 7 days under an atmosphere of $CO_2$ (15 p.s.i.). Thereafter, the beer was treated with a silicate (Clearfil) adsorbent to promote protein stability and then pumped into a secondary aging tank wherein it was maintained for 10 days at −1° C. 14 gms. of a papain-based (double strength Protesal) chillproofing agent, 168 gms. sodium metabisulfite and 450 gms. of an alginate (Kelcoloid) were added to the beer. Following secondary aging, the beer was polished by filtration through a diatomaceous earth filter bed. Thereafter, the beer was bottled under an atmosphere of $CO_2$; before capping, the bottles were tapped to release dissolved oxygen.

The bottled beer was stored at room temperature or in a refrigerator at +4° C. Tasting was made immediately after bottling and during storage. The matured beer was judged by means of standard physico-chemical analysis and organoleptic tests. Pertinent results as well as the analysis of a commercial control beer derived from the wort of Part B and the barley beer derived from the wort of Part C are shown in Table II below.

TABLE II

| Property | Barley beer (invention) | Conventional malt beer (control) | Barley beer prior art (comparison) |
|---|---|---|---|
| Apparent extract (percent) | 2.2 | 2.5 | 2.8 |
| Real extract | 3.97 | 4.3 | 4.5 |
| Apparent attenuation (percent) | 81.0 | 78.0 | 76.1 |
| Alcohol: | | | |
| Percent by weight | 3.93 | 3.75 | 3.71 |
| Percent by volume | 5.01 | 4.80 | 4.74 |
| Calculated original extract (° P.) | 11.6 | 11.6 | 11.7 |
| Calculated protein (percent) | 0.35 | 0.37 | 0.32 |
| Color (SRM) | 2.8 | 2.7 | 2.7 |
| pH | 4.2 | 4.0 | 4.3 |
| Acidity (percent) | 0.16 | 0.14 | 0.18 |
| Isohumulone (IBU) | 15 | 18 | 19 |
| Foam (SIGMA) | 126 | 136 | 132 |
| Diacetyl (p.p.m.) | 0.09 | 0.09 | 0.15 |
| $SO_2$ (p.p.m.) | 9 | 8 | 8 |
| $CO_2$ (vol.) | 2.80 | 2.82 | 2.85 |
| Air (mls.) | 0.9 | 0.9 | 0.8 |
| Force haze test (F.T.U's): | | | |
| 1 week | 120 | 160 | 150 |
| 3 months | 130 | 170 | 150 |

Referring to this table, it will be seen that the barley beer of Part A is similar in most respects to the control beer, save that it has superior haze stability and higher alcohol content. Generally speaking its properties are superior to those of the prior art barley beer of Part C, notable in the higher apparent attenuation value of 81.0% as compared to 76.1%. With regard to organoleptic properties, statistical analysis of the results obtained from experienced brewery taste panels, showed that there was no clear preference for either the barley beer of this invention or the conventional malt beer, but that there was a slight preference for both over the barley beer derived from the wort of Part C (complex enzyme preparation). The barley beer of Part A had a mild to medium hop character and overall flavor fullness, with a clean and neutral aroma.

Example 2

This example illustrates the preparation of a brewers' wort and beer according to this invention in the same commercial brewery as in the foregoing but employing a different mash bill and brewing procedure.

Part A—Brewers' wort

MASH BILL

| Constituent | Weight (kgs.) | Parts by weight of total |
|---|---|---|
| Ground barley [1] | 952 | 68 |
| Malt [2] | 453 | 32 |

[1] Similar to that used in Example 1.
[2] Ground barley malt (80% Conquest:20% Betzes) was used with a diastatic activity of 130° Lintner and a moisture content of 4.0%. The grist spectrum as determined by sieve analysis was as follows:

| Sieve No. | Percent w./w. retained on |
|---|---|
| 10 | 59.5 |
| 14 | 14.9 |
| 18 | 10.5 |
| 30 | 6.9 |
| 60 | 3.2 |
| 100 | 1.6 |
| 100+ | 3.9 |
| Total | 100.5 |

Enzymes

A composition comprising an intimate blend of 45 parts by weight powdered papain, 5 parts by weight powdered ficin and 50 parts by weight sodium metabisulfite as the activator was used. This composition had an activity of 84 Azocoll units per milligram. This prepared composition was used in the mashing process at a level of 1.2 kgs. to provide about 94 Azocoll units of protease activity for each gm. of unmalted cereal grain, in this instance only the barley, used in the mash bill.

Mash cycle

Step (i).—25 bbls. of brewery water were added to the mash tun and calcium chloride and dilute sulfuric acid added as in Example 1. The water was brought to a steady temperature of 69° C. and the 952 kgs. barley added thereto. The slurry so-obtained was vigorously stirred and, when the temperature had fallen to 66° C., 1.2 kgs. of the prepared proteolytic enzyme-activator composition slurried in about 1 gallon water were added thereto. The slurry was allowed to rest at 66° C. for 40 minutes and, at ten minute intervals, was vigorously agitated.

Step (ii).—The 453 kgs. brewers' malt were added to 6 bbls. water treated with 450 gms. calcium chloride in a cooker, and the malt mash brought to 40° C., at which temperature it was allowed to rest for 30 minutes. It was then brought up to 66° C. in 30 minutes and immediately thereafter pumped over to and droped into the mash tun. The combined mash was allowed to rest for 40 minutes at 66° C. with brisk agitation every 10 minutes. The mash was then brought up to 72° C. in 10 minutes, at which temperature it was allowed to rest, with continuous agitation, for 15 minutes. The mash was then raised to from 75° to 76° C. over 5 minutes to inactivate the enzymes, and dropped directly into the lauter tun wherein it was sparged with brewing water at 74° C. 72 bbls. of a clear wort were obtained in a run-off time of 155 minutes. The analysis of this wort is summarized in Table III below.

TABLE III

Property:
Extract (° P) _____ 9.9
Total nitrogen (p.p.m.) _____ 952
Formol nitrogen (p.p.m.) _____ 274
pH _____ 5.0
Apparent attenuation _____ 74.5

This wort was fermented into a beer, blended with a similar amount of beer obtained in a duplicate run, matured and bottled following the procedure of the foregoing example. The analysis of this beer is summarized in Table IV below:

TABLE IV

| Property | |
|---|---|
| Apparent extract (percent) | 1.5 |
| Real extract (percent) | 3.00 |
| Alcohol: | |
| (percent by weight) | 3.50 |
| (percent by volume) | 4.50 |
| Calculated original extract (° P) | 10.0 |
| Protein (percent) | 0.37 |
| Color (SRM) | 2.8 |
| pH | 4.15 |
| Isohumulone (IBU) | 15.0 |
| Foam (SIGMA) | 107 |
| Diacetyl (p.p.m.) | 0.10 |
| $SO_2$ (p.p.m.) | 3.0 |
| $CO_2$ (vol.) | 2.69 |
| Air (ml.) | 0.7 |
| Force Haze Test (F.T.U.'s): | |
| 1 week | 130 |
| 3 months | 140 |

This beer, which was very acceptable, had a light to moderate body and mild to moderate hop characteristics.

Example 3

This example illustrates that, in comparable mash bills, the action of a protease enzyme alone in accordance with this invention gives a brewers' wort with essentially the same properties as that obtained using a mixture of protease and an α-amylase enzyme according to prior art practice. The experiments were conducted on standard laboratory mash units fitted with mash cups.

Mash bill (per mash cup)

| Constituent: | Parts by weight |
|---|---|
| Malt | 20 |
| Dehulled ground barley | 80 |

The whole barley (Conquest) was dehulled in a barley huller. The kernels were ground to 20 mesh and recombined with the hulls (90:10 kernel:hulls). The malt was a regular grind gibberellic acid-treated malt of 230° Lintner.

Protease enzyme

The protease enzyme used was a papain similar to that used in Example 1. This particular papain assayed at about 168 Azocoll units per mg. and in all experiments 80 mg. of this enzyme (equivalent to about 42 Azocoll units of protease activity per gm. of barley) were added to each cup in combination with 96 mg. sodium metabisulfite.

α-amylase

The α-amylase (purified) used in the comparative experiments was a purified bacterial α-amylase derived from *Bacillus subtilis* ATCC 21556 with an activity level of 3160 α-amylase units/mg. and no measurable proteolytic activity. This enzyme was added to the cups in amounts of 2 mg. and 4 mg. (as indicated) equivalent to 54 and 108 α-amylase units per gm. of barley respectively.

Mashing process 140 mls. mash water at pH 5.4 (100 p.p.m. $Ca^{++}$) were brought to steady temperature of 41° C. in the mash cup, then, the salts, enzymes and barley and malt were added in that order, allowing about 30 seconds between each addition for thorough mixing. The slurry was vigorously agitated throughout the mash cycle. The mash was held at 41° C. for 30 minutes, brought up to 66° C. in 20 minutes at which temperature it was held for 40 minutes, brought up to 72° C. in 10 minutes and held at that temperature for 15 minutes and, finally, raised to 75° C. in 5 minutes to inactivate the enzymes. The mash was then lautered and the lauter time recorded. The clarity of the run-off was estimated visually according to a graded scale from 1 to 5, ranging from a murky, cloudy wort to a clear, bright and sparkling wort. The starch conversion was checked by the iodine color test.

Results: The analysis of the worts obtained in the various runs are set forth in Table V below, which also includes data for a malt control run (60 parts barley malt:40 parts corn) conducted under identical conditions.

TABLE V

| Property | Run #1 | #2 | #3 | Control |
|---|---|---|---|---|
| Extract (° P.) | 14.06 | 14.0 | 14.1 | 13.8 |
| Total nitrogen (p.p.m.) | 1407 | 1480 | 1454 | 1420 |
| Formol nitrogen (p.p.m.) | 366 | 348 | 363 | 358 |
| Apparent extract after rapid fermentation (° P.) | 3.3 | 3.0 | 2.9 | 2.8 |
| Apparent attenuation (percent) | 76.5 | 78.5 | 79.4 | 79.7 |
| Calculated extract (° P.) | 13.73 | 13.68 | 13.78 | 13.64 |
| Conversion (percent) | 94.3 | 93.9 | 94.6 | 95.0 |
| Run-off clarity | 4 | 5 | 5 | 5 |
| Run-off time (mins.) | 35 | 30 | 25 | 30 |
| Starch conversion | Good | Good | Good | Good |

Run #1 ≡ 80 mg. papain+96 mg. sodium metabisulfite +2 mg. α-amylase (purified).
Run #2 ≡ 80 mg. papain+96 mg. sodium metabisulfite +4 mg. α-amylase (purified).
Run #3 ≡ 80 mg. papain+96 mg. sodium metabisulfite.

Conclusions: The results reported in the foregoing table indicate that the wort resulting from the process of this invention (Run #3) had a similar nitrogen profile to the wort of Runs #1 and 2 and the malt control. However, the wort of Run #3 had a significantly lower apparent extract value than Runs #1 and 2 and, therefore, a higher apparent attenuation which indicate an important advantage in that the wort of Run #3 had a superior fermentable sugar content. Another surprising and advantageous feature is that a slightly higher conversion of the ground barley was obtained in Run #3 as compared to Runs #1 and 2.

Example 4

This example illustrates the use of mixtures of two different protease enzymes (papain and ficin) acording to this invention and, for comparative purposes, mixtures of protease and α-amylase enzymes. The various runs were conducted on standard laboratory mash units fitted with both cooker and mash cups. The following raw materials were used:

Mash bill

| Constituent: | Parts by weight |
|---|---|
| Barley | 40 |
| Corn | 40 |
| Malt | 20 |

The barley was steeped for 1 hour in 50 ml. water at 47° C. The water was drained off and assayed. Immediately after the steep, the barley was milled to an average particle size of around 1.41 mm. The corn was likewise ground to an average particle size of around 1.41 mm. The malt was a gibberellic acid treated brewers' malt of 190° Lintner. The following combinations of enzymes were used in the different runs.

Runs #1A and 1B (Invention)

Papain:
- Wt. (per cup) ---------- 36 mg.
- Activity level per mg. ---- 84 Azocoll units.
- Activity level per gm. Unmalted cereal substrate -- 40 Azocoll units.

Ficin:
- Wt. ---------- 4 mg.
- Activity level per mg. ------ 84 Azocoll units.
- Activity level per gm. Unmalted cereal substrate -- 4.5 Azocoll units.
- Total protease activity per gm. unmalted cereal substrate ---- 44.5 Azocoll units.

Runs #2A and 2B (Comparison)

Papain:
- Wt. ---------- 36 mg.
- Activity level per mg. ----- 84 Azocoll units.
- Activity level per gm. unmalted cereal substrate -- 40 Azocoll units.

α-Amylase:[1]
- Wt. ---------- 4 mg.
- Activity level per mg. ----- 2600 α-amylase units.
- Activity level per gm. unmalted cereal substrate -- 138 α-amylase units.

Runs #3A and 3B (Comparison)

Papain:
- Wt. ---------- 34 mg.
- Activity level per mg. ----- 84 Azocoll units.
- Activity level per gm. unmalted cereal substrate -- 38 Azocoll units.

Ficin:
- Wt. ---------- 3 mg.
- Activity level per mg. ----- 84 Azocoll units.
- Activity level per mg. cereal substrate ---- 3.5 Azocoll units.

α-Amylase:[1]
- Wt. ---------- 3 mg.
- Activity level per mg. ----- 2,600 α-amylase units.
- Activity level per gm. cereal substrate ---- 104 α-amylase units.

[1] A commercially available amyloglucosidase enzyme, which, in addition to the α-amylase activity, had a glucoamylase activity of 5×10⁻³ D.U. per mg.

Mash cycle

The mash water at pH 5.4 (100 p.p.m. Ca$^{++}$) was brought to a steady temperature of 40° C. in the mash cups, then, the salts, enzymes, barley and malt were added to each of the mash cups in that order, allowing about 30 seconds between each addition for thorough mixing. The slurry was vigorously agitated throughout the mash cycle. The main mash was allowed to rest at 40° C. for 20 minutes. A cereal adjunct mash was prepared by bringing 100 mls. mash water (Ca$^{++}$=160 p.p.m.) to a steady temperature of 50° C. in the cooker cups. All of the corn was added along with 2 mls. Brewhouse Convertase to the cooker cups and the slurry stirred for 5 minutes. Thereafter, the remainder of the corn was added, and, while stirring continuously, the temperature was raised to 70° C. over 15 minutes, at which temperature it was allowed to rest for 15 minutes before being raised to 90° C. over 30 minutes, and finally boiled for 2 minutes. The boiling adjunct mash was dropped into the main mash, the temperature of which was raised to 65° C. over 15 minutes and allowed to rest at this temperature for 3 hours. Thereafter the mash was brought to 72° C. over 10 minutes to inactivate the enzymes therein. The mash was then lautered and the lauter bed sparged with water at 72° C. to a total volume of wort of 610 mls. The made up wort was then boiled for 1 minute, allowed to cool, then again made up to 610 mls. prior to analysis.

Results.—The results from the various runs are set forth in Table VI below:

TABLE VI

| Property | #1A | #1B | #2A | #2B | #3A | #3B | Malt control 60:40 |
|---|---|---|---|---|---|---|---|
| Extract (° P.) | 9.6 | 9.7 | 9.7 | 9.6 | 9.7 | 9.6 | 10.1 |
| Apparent extract after rapid fermentation (° P.) | 1.7 | 1.7 | 1.8 | 1.8 | 2.0 | 1.9 | 1.8 |
| Apparent attenuation (percent) | 82.3 | 82.5 | 81.4 | 81.3 | 79.4 | 80.2 | 82.2 |
| Total nitrogen (p.p.m.) | 973 | 952 | 1050 | 1043 | 777 | 770 | 990 |
| Formol nitrogen (p.p.m.) | 199 | 204 | 199 | 207 | 200 | 199 | 212 |

Conclusions.—The results reported in the foregoing table indicate that the wort obtained in Run #1 most closely approaches the properties of the malt control wort. It is significant that the wort of Run #1 had a higher apparent attenuation that the wort of Runs #2 and 3 in which α-amylase enzyme was used in conjunction with a protease enzyme.

Example 5

This example illustrates the effect of varying the malt content and also the effect of different enzyme systems on wort properties.

The mash bill used in each of the three runs included only ground barley and brewers' malt in the proportions shown in the table below. The barley was ground on a laboratory scale grinder to an average particle size of around 1.41 mm. The malt was ordinary brewers' malt with a diastatic activity of 136° Lintner. The following enzyme systems were used in the three runs:

Run #1

Papain:
- Wt. (per cup) ---------- 40 mg.
- Activity level per mg. ----- 84 Azocoll units.
- Activity level per gm. unmalted barley ---------- 38 Azocoll units.

Run #2

α-Amylase (purified):
- Wt. (per cup) ---------- 1.5 mg.
- Activity level per mg. ------ 3150 α-amylase units.
- Activity level per gm. unmalted barley ---------- 55 α-amylase units.

Run #3

Papain:
- Wt. (per cup) ---------- 40 mg.
- Activity level per mg. ---- 84 Azocoll units.
- Activity level per gm. unmalted barley ---------- 38 Azocoll units.

α-Amylase (purified):
- Wt. (per cup) ---------- 1.5 mg.
- Activity level per mg. ----- 3160 α-amylase units.
- Activity level per gm. unmalted barley ---------- 55 α-amylase units.

The mash cycle used in each instance involved the following. 250 mls. brewery treated water was brought to a steady temperature of 45° C. in the mash cups, then, the salts, enzyme(s), barley and malt were added in that order, allowing about 30 seconds between each addition for thorough mixing. The slurry was vigorously agitated throughout the mash cycle. The mash was held at 45° C. for 60 minutes, brought up to 66° C. in 45 minutes and allowed to rest at this temperature for 375 minutes, and finally raised to 75° C. in 5 minutes to inactivate the enzymes. The cooled mash was then analyzed and the results obtained for the various runs are summarized in the Table VII which follows:

TABLE VII

| Part | Parts by weight | | Apparent extract after fermentation, ° P. | | | Extract, ° P | | | Total nitrogen (p.p.m.) | | | Formol nitrogen (p.p.m.) | | |
|---|---|---|---|---|---|---|---|---|---|---|---|---|---|---|
| | Barley | Brewers' malt | Run #1 | Run #2 | Run #3 | Run #1 | Run #2 | Run #3 | Run #1 | Run #2 | Run #3 | Run #1 | Run #2 | Run #3 |
| A | 100 | 0 | 5.5 | 4.5 | 4.5 | 11.7 | 12.8 | 12.7 | 1,099 | 854 | 1,113 | 280 | 216 | 272 |
| B | 95 | 5 | 4.6 | 5.4 | 5.3 | 13.4 | 13.4 | 13.6 | 1,092 | 952 | 1,120 | 283 | 246 | 290 |
| C | 90 | 10 | 4.8 | 4.9 | 4.8 | 13.9 | 13.9 | 13.9 | 1,225 | 1,043 | 1,246 | 313 | 263 | 314 |
| D | 80 | 20 | 3.7 | 3.9 | 4.0 | 13.5 | 13.5 | 14.1 | 1,262 | 1,032 | 1,256 | 330 | 287 | 336 |
| E | 75 | 25 | 3.5 | 3.4 | 3.3 | 14.1 | 14.1 | 14.2 | 1,234 | 1,092 | 1,085 | 360 | 310 | 309 |
| F | 70 | 30 | 3.7 | 3.7 | 3.6 | 13.9 | 14.2 | 14.0 | 1,302 | 1,162 | 1,344 | 377 | 341 | 392 |

Conclusions.—As regards the enzyme systems used the results presented in the foregoing table further confirm that a protease enzyme alone (Run #1) gives just as effective a conversion as the use of a combination of a protease and α-amylase enzyme at comparable levels (Run #3), and a superior conversion to that obtained using an α-amylase alone (Run #2). With regard to malt level, the results indicate that the wort properties, as reflected in the nitrogen and carbohydrate profiles, improve significantly with increasing malt content up to about 20 parts by weight, but the properties at 25 and 30 parts by weight malt are not much different from those at the 20 part level.

Example 6

This example illustrates the manufacture of brewers' worts and their conversion into beer in a pilot plant brewery using different enzyme systems and mash bills as follows.

MASH BILL

| | Weight (kgs.) | Parts by weight |
|---|---|---|
| Run #1 | | |
| Ground barley [1] | 8.1 | 81 |
| Malt [2] | 1.9 | 19 |
| Run #2: | | |
| Ground barley [1] | 8.1 | 81 |
| Malt [2] | 1.9 | 19 |
| Run #3: | | |
| Ground barley [1] | 7.1 | 72 |
| Malt [2] | 2.8 | 28 |

[1] Conquest barley was used. This barley was cleaned and then hulled giving around 10% w./w. hulls, and the hulls separated by aspiration. The barley kernels were then ground on a Hobart Model 2020 grinder to an average particle size of less than 2 mm. but without producing any significant quantities of fine particles that would pass through a No. 60 mesh sieve.
[2] Ordinary brewers' malt was used with a diastatic activity of 137° Lintner.

Enzyme

Run #1
Papain:
  Wt. ———————————— 8 gms.
  Activity level per mg. ———— 84 Azocoll units.
  Activity level per gm. unmalted barley substrate — 80 Azocoll units.

Run #2
Papain:
  Wt. ———————————— 8 gms.
  Activity level per mg. ———— 84 Azocoll units.
  Activity level per gm. unmalted barley substrate — 80 Azocoll units.
α-Amylase (purified)
  Wt. ———————————— 200 mgs.
  Activity level per mg. ———— 3160 α-amylase units.
  Activity level per gm. unmalted barley substrate — 78 α-amylase units.

Run #3
α-Amylase (purified)
  Wt. ———————————— 200 mgs.
  Activity level per mg. ———— 3160 α-amylase units.
  Activity level per gm. unmalted barley substrate — 81 α-amylase units.

Procedure (Runs #1 to 3)

The barley and the malt were slurried with 35 litres of water at 40° C. in a steam-jacketted mash tun. The appropriate enzyme(s) was added to this slurry along with 9.6 gms. sodium metabisulfite and 21.2 gms. gypsum. The mash was held at 40° C. for 30 minutes, then raised to 66° C. over 20 minutes, at which temperature it was held for 60 minutes before being raised to 72° C. over 10 minutes. After 15 minutes at 72° C., the digested mash was raised to 75° C. and held at this temperature for 5 minutes. The mash was lautered and sparged with water at 74° C. to a total volume of 61.3 litres of wort. Following lautering and sparging, the wort was transferred to the kettle. The wort, to which about 72 gms. of hops were added, was boiled in the kettle for 90 minutes, during which the volume fell from 61 litres to 56 litres. The wort was then cooled to 58° C. in a plate cooler after which it was subjected to analysis. The data obtained for the worts of Runs #1 to 3 are listed in Table VIII below.

TABLE VIII

| Property | Run #1 (invention) | Run #2 (comparison) | Run #3 (comparison) |
|---|---|---|---|
| Extract (° P.) | 10.0 | 9.9 | 9.7 |
| Apparent extract after rapid fermentation (° P.) | 3.1 | 3.1 | 3.2 |
| Apparent attenuation (percent) | 69.00 | 68.68 | 67.01 |
| Total nitrogen (p.p.m.) | 1,015 | 1,098 | 910 |
| Formol nitrogen (p.p.m.) | 302 | 277 | 234 |

The worts are then fermented into beer using a similar procedure to that described in Example 1.

The results indicate that the wort obtained from Run #1 according to the invention in which a protease (papain) enzyme only was used in the conversion had superior properties to the worts of Runs #2 and 3 in which a mixture of a protease and an α-amylase enzyme (as in the prior art) or an α-amylase enzyme alone respectively were used. In particular, it will be noted that the wort of Run #1 had a slightly higher apparent attenuation.

The foregoing examples demonstrate that the process of this invention provides a highly acceptable brewers' wort and beer from a mash bill wherein a major proportion of the cereal grains are unmalted using a proteolytic enzyme as the only discrete enzyme added to effect conversion. This is in contrast to the prior art relating to the replacement of malt as the primary enzymatic agent in a mash bill which teaches that a discrete enzyme system containing both proteolytic and α-amylase activity is required.

Although the present invention has been illustrated by reference to preferred embodiments, it will be understood that modifications and variations may be employed without departing from the spirit and scope of the invention, as those skilled in the art will readily understand. Such variations and modifications are therefore considered to be within the purview and scope of the appended claims.

What is claimed is:
1. A process of making a wort from a mash bill comprising a grain mixture of unmalted raw cereal grain and malt which contains at least 20 parts by weight of an enzymically rich raw cereal grain, from about 5 to 35 parts by weight malt and a starchy low-enzymic cereal adjunct making up the remainder of the mixture to provide a total of 100 parts by weight for the mixture, comprising the steps of
- A. combining with said raw cereal grain water and an enzyme system consisting of discrete proteolytic enzymes having substantially proteolytic activity only, to form an aqueous mash,
  1. said enzymes being taken from the group consisting of plant, bacterial and fungal proteases,
  2. said enzyme system providing at least 10 Azocoll units per gram of raw cereal grain;
- B. maintaining the mash at
  1. a pH of between 4.9 and 6.5
  2. at a temperature of from 40° C. to 60° C.
  3. for from 10 to 480 minutes;
- C. adding said malt and adjunct at any time during steps A and B;
- D. then raising the mash temperature higher than in step B up to a maximum of 75° C. in one or more stages;
- E. separating the wort from the residual solid material, whereby the proteolytic enzyme acts upon the enzymically rich raw cereal grain to liberate bound β-amylase and other enzymes present therein and the addition of amylase enzymes other than inherently present in said raw cereal grain and malt is eliminated in said process.

2. Process as claimed in claim 1, wherein the mash bill also includes up to about 45 parts by weight of a starchy low enzymic cereal grain adjunct.

3. Process as claimed in claim 1, wherein the mash immediately prior to the separation step is briefly heated at a temperature that inactivates the enzymes present therein.

4. Process as claimed in claim 1, wherein the proteolytic enzyme is used in an amount of between about 30 and about 300 Azocoll units per gm. of unmalted cereal grain in the mash bill.

5. Process as claimed in claim 4, wherein the proteolytic enzyme is used in an amount of between about 40 and about 160 Azocoll units per gm. of unmalted cereal grain in the mash bill.

6. Process as claimed in claim 1, wherein the proteolytic enzyme is papain.

7. Process as claimed in claim 1, wherein the proteolytic enzyme is ficin.

8. Process as claimed in claim 1, wherein the proteolytic enzyme is used in combination with an activator thereof.

9. Process as claimed in claim 8, wherein the activator is a reducing agent.

10. Process as claimed in claim 9, wherein the activator is sodium metabisulfite.

11. Process as claimed in claim 1, wherein the resulting wort is concentrated into a syrup.

12. Process as claimed in claim 1, wherein the resulting wort is dried into a powder.

13. Process for the production of a fermented malt alcoholic beverage, wherein the wort obtained by the process of claim 1, after the addition of bittering adjuncts, is subjected to alcoholic fermentation.

14. A process of making a wort from a mash bill comprising a grain mixture of unmalted raw cereal grain and malt which contains at least 20 parts by weight of an enzymically rich raw cereal grain, from about 5 to 35 parts by weight malt and a starchy low-enzymic cereal adjunct making up the remainder of the mixture to provide a total of 100 parts by weight for the mixture, comprising the steps of
- A. commingling an aqueous slurry of said enzymically rich raw cereal grain with an enzyme system consisting of discrete proteolytic enzymes having substantially proteolytic activity only and taken from the group consisting of plant bacterial and fungal proteases to provide at least 10 Azocoll units per gram of raw cereal grain and, optionally, some or all of the malt, then
- B. with the pH of the mash at between about 4.9 and about 6.5 allowing the mash to rest
  1. at a temperature of between about 40° and about 60° C.
  2. for between about 40 and about 240 minutes whereby the proteolytic enzyme acts upon the ground cereal grain to liberate the bound β-amylase and other enzymes present therein, and the addition of amylase enzymes other than inherently present in said raw cereal grain and malt is eliminated in said process;
- C. introducing the remainder or all of said malt and all of the cereal adjunct in liquefied form, in any desired order;
- D. raising the temperature of the mash higher than in step B to between about 60° and about 75° C.,
  1. allowing the mash to rest at a temperature in this range for a predetermined period of time so that the desired amount of fermentable sugar is produced and then
- E. separating the wort so obtained from the residual solid material.

15. Process for manufacturing a brewers' wort from a mash bill which includes a grain mixture of about 70 to about 90 parts by weight of an enzymically rich unmalted raw cereal grain taken from the group consisting of barley, wheat and rye, and between about 10 and about 30 parts by weight of malt to provide a total of 100 parts by weight for the mixture, said process comprising
- A. commingling an aqueous slurry of the said enzymically rich raw cereal grain with an enzyme system consisting of discrete proteolytic enzymes having substantially proteolytic activity only to provide at least 10 Azocoll units per gram of raw cereal grain, said enzymes being taken from the group consisting of plant bacterial and fungal proteases and, optionally, some or all of said malt, then
- B. with the pH of the mash at between about 4.9 and about 6.5 allowing the mash to rest
  1. at a temperature of between about 40° and about 60° C.
  2. for between about 40 and about 240 minutes whereby the proteolytic enzyme acts upon the ground cereal grain to liberate the bound β-amylase and other enzymes present therein, and the addition of amylase enzymes other than inherently present in said raw cereal grain and malt is eliminated in said process;
- C. introducing the remainder or all of said malt;
- D. raising the temperature of the mash higher than in step B to between about 60° and about 74° C.,
  1. allowing the mash to rest at this temperature for a predetermined period of time so that the desired amount of fermentable sugar is produced and then
- E separating the wort so obtained from the residual solid material.

References Cited

UNITED STATES PATENTS

| | | | |
|---|---|---|---|
| 3,081,172 | 3/1963 | Dennis et al. | 99—50 X |
| 3,353,960 | 11/1967 | Barisotto | 99—52 |
| 3,576,645 | 4/1971 | Rozsa | 99—50 X |
| 3,095,358 | 6/1963 | Meister | 195—63 |
| 2,676,138 | 4/1954 | Hinkel, Jr. | 195—63 |
| 1,673,273 | 6/1928 | Wallerstein | 99—52 |
| 2,790,718 | 4/1957 | Nugey | 99—51 |

FOREIGN PATENTS

| | | | |
|---|---|---|---|
| 1,202,976 | 8/1970 | Great Britain | 99—52 |
| 1,221,146 | 2/1971 | Great Britain | 99—52 |

DAVID M. NAFF, Primary Examiner

U.S. Cl. X.R.

426—436

UNITED STATES PATENT OFFICE
CERTIFICATE OF CORRECTION

Patent No. 3,795,745                     Dated March 5, 1974

Inventor(s) Mortimer Wilkes Brenner

It is certified that error appears in the above-identified patent and that said Letters Patent are hereby corrected as shown below:

Column 1, line 63, "α-amylase" should be --β-amylase--;
          line 66, "highi" should be --high--.
Column 3, line 63, "can" should be --cant--.
Column 4, line 57, "melting" should be --malting--.
Column 5, line 34, there should be a comma --,-- after "bill";
          line 35, "mast" should be --mash--.
Column 8, line 7, "barely" should be --barley--;
          line 32, delete the comma "," after "barley" (first instance).
Column 12, line 72, "hope" should be --hops--.
Column 18, lines 7 and 8, insert a period --.-- after "minutes and delete "to inactivate the enzymes therein.";
          line 55, "3150" should be --3160--.
Column 19, line 59, "80" should be --83--;
          line 65, "80" should be --83--;
          line 76, "81" should be --89--.
Column 21, line 21, after "material" change the comma "," to a semi-colon --;--.
Column 22, line 62, "Barisotto" should be --Bavisotto--.

Column 7, line 19, "170° C." should be --170° F.--.

Signed and sealed this 5th day of November 1974.

(SEAL)
Attest:

McCOY M. GIBSON JR.
Attesting Officer

C. MARSHALL DANN
Commissioner of Patents